Patented July 24, 1951

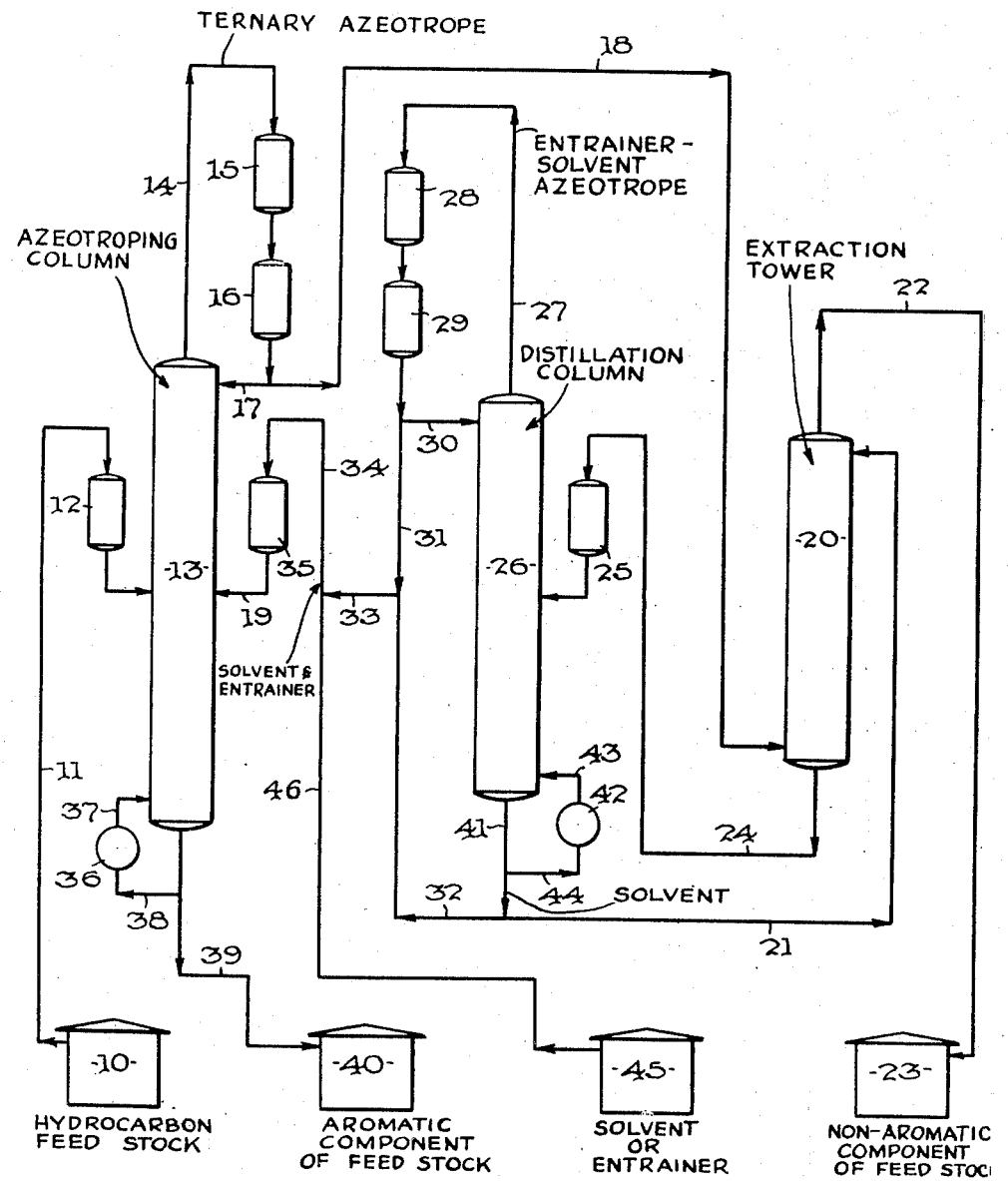

2,561,624

UNITED STATES PATENT OFFICE 2,561,624

SEPARATION OF CYCLOHEXANE AND BENZENE BY AZEOTROPIC DISTILLATION

James M. Harrison, Oakmont, Pa., assignor to Gulf Research & Development Company, Pittsburgh, Pa., a corporation of Delaware Application April 14, 1948, Serial No. 20,947

4 Claims. (Cl. 202—42)

1

This invention relates to a process of azeotropic distillation and more particularly to the recovery of the azeotrope-forming agent used in such distillation.

The addition of an entrainer to a mixture being distilled is often practiced in order to obtain a certain desired separation that would otherwise be impossible by straight distillation. This added compound forms an azeotrope with part of the original mixture and is then removed from the distillation column as overhead vapors, since it is the most volatile material in the system. Ordinarily it is desired to make a process continuous, so that in this case it becomes necessary to recover the entrainer from its azeotrope so that it may be recycled to the azeotroping column.

Some methods of separating the constituents of an azeotrope are obvious, while certain other schemes already have been proposed. A summary of some of these methods is herein described. The simplest method of separation occurs when the azeotrope forms two phases, one phase of which is the entrainer. An example of this method is the use of toluene to dehydrate pyridine. If the necessary amount of toluene is added to aqueous pyridine and the mixture distilled, the toluene-water azeotrope will be removed from the pyridine. Upon condensation of the overhead vapors, the toluene-water azeotrope will yield a two-phase liquid product from which the toluene may be recovered from the water by simple decantation. The components of such a system should be soluble in each other at the distillation temperature but insoluble at room temperature or some convenient temperature below the boiling point of the azeotrope. Such desirable systems rarely exist, so it is usually necessary to seek additional methods of separation.

Another known method is the one which takes place by means of the difference in solubility of the components of the azeotrope in a third substance from which the more soluble member can be readily recovered. An example of such a system would be the separation of a hydrocarbon-methanol azeotrope by water washing. The methanol would be removed from the hydrocarbon, since it would be dissolved preferentially by the water. The methanol-water mixture is then easily resolved into the two pure constituents by simple distillation.

Another method utilizes the change of azeotropic composition with pressure, and by the redistillation of the azeotrope at a different pressure, sufficient change in composition is obtained to permit resolution of the components. An example of this method is the azeotropic separation of styrene and ethylbenzene using isobutanol. The azeotropic overhead, when the distillation is carried out at 60 mm. Hg pressure, contains about 43 wt. per cent ethylbenzene and 57 wt. per cent isobutanol. If this azeotropic mixture be distilled now at say 3600 mm. Hg pressure, no azeotrope is formed, and complete separation can be accomplished.

Still another method consists of rectifying a binary azeotrope in the presence of a third liquid, preferably of different solubility in the components of the binary, which forms a ternary azeotrope wherein the relationship of the components of the original binary are altered. An illustration of this is the separation of the 1-nitropropane-ethylbenzene azeotrope. This binary azeotrope has the approximate composition of 59 wt. per cent 1-nitropropane and 41 wt. per cent ethylbenzene. The ternary azeotrope with water has the following composition: 35.8 wt. percent 1-nitropropane, 36.5 wt. per cent ethylbenzene, and 27.7 wt. per cent water. This ternary composition, expressed on a water-free basis, has a composition of 49.5 wt. per cent 1-nitropropane and 50.5 wt. per cent ethylbenzene. Therefore, when the binary azeotrope is charged to a distillation column along with the necessary amount of water, a ternary azeotrope is removed overhead, and the excess 1-nitropropane is removed from the tower as bottoms.

There exists, however, a large number of cases where binary azeotropes cannot be satisfactorily resolved into pure constituents by any of the known and practiced methods such as have just been described.

Perhaps the most widely practiced of these known methods is the one that takes advantage of the difference in solubility of the constituents of the azeotrope in some solvent. The constituent dissolved in the solvent must then be easily separable from the solvent. One of the most easily handled methods for doing this is distillation. Here, however, great difficulty is frequently met, because the two substances may form an azeotropic mixture which is difficult to resolve into the pure components.

An object of this invention is to provide a continuous azeotropic distillation process in which many of the foregoing difficulties are avoided.

Therefore another object is the provision of a method whereby components of an azeotrope can be reused without complete separation and a completely continuous azeotropic process will result.

A further object is to provide a method for performing a ternary azeotropic distillation with an entrainer-solvent mixture, involving as the ternary azeotrope a component of the mixture to be separated, an entrainer and a solvent for the entrainer.

A still further object is the continuous recovery and utilization of this entrainer-solvent mixture.

These and other objects are accomplished by the following invention which comprises a cyclical process for performing a ternary azotropic distillation having the following steps: To a mixture, one component of which is desired to be separated by azeotropic distillation, a suitable entrainer and solvent therefore is added, said component of the mixture desired to be separated by azeotropic distillation being substantially insoluble in said solvent, and then distilling off a ternary azeotropic mixture comprising the component from the original mixture, the entrainer and the solvent, and recovering the other component as bottoms, and then washing the ternary azeotropic mixture with an additional amount of solvent, separating the component from the original mixture as insoluble, then subjecting the entrainer-solvent mixture to a binary distillation and finally adding the binary azeotropic distillate comprising entrainer and solvent plus a portion of the bottoms comprising solvent (the portion of the bottoms solvent which is added to the binary azeotrope being such that the resulting mixture is equivalent to the amount of entrainer and solvent which was added to the original ternary distillation) to the ternary distillation while the remainder of the bottoms from the binary distillation of the entrainer and the solvent, comprising solvent is employed to extract additional ternary azeotropic distillate.

In the accompanying drawing we have illustrated a diagrammatic elevation of suitable apparatus for carrying out our invention. Referring to the drawing, the mixture which is to be separated is charged from the feed tank 10 to line 11 and preheater 12 into the main azeotroping column 13. From storage tank 45 there is also charged to column 13 through line 46 to line 34 through preheater 35 and line 19 a suitable mixture of entrainer and of solvent, said entrainer-solvent mixture being such that the component of the mixture which is desired to be separated as overhead in the azeotropic distillation is relatively insoluble therein. Upon distillation in column 13, a ternary azeotrope is formed between the component of the mixture, the entrainer and the solvent and this ternary azeotrope is removed overhead through line 14 for condensation in condenser 15 and collection in accumulator 16. A portion of the condensate is returned as reflux to tower 13 through line 17 and the remainder is passed through line 18 for subsequent removal of the component from the mixture and for preparation of the entrainer-solvent mixture for recycle use. The remaining component of the original mixture is removed as bottoms from column 13 by means of line 39 where it can be sent to storage in tank 40. Heat is supplied to tower 13 by means of a reboiler 36 through which a portion of the bottoms from the tower is circulated through lines 38 and 37. The operating conditions are so maintained that substantially none of this constituent appears in the overhead vapor in column 13.

The azeotropic condensate from line 18, consisting of the component from the original mixture, entrainer, and solvent, is passed to extraction tower 20 where it is subjected to countercurrent solvent washing. The solvent is supplied through line 21 in amount sufficient to completely dissolve the entrainer and free the component of the original mixture for removal from tower 20 through line 22 into the storage tank 23. The entrainer and solvent mixture comprising the original amount of entrainer from the azeotropic distillation, and original amount of solvent from the azeotropic distillation plus the amount of solvent that was added through line 21 for the washing, are removed from the tower 20 by means of line 24 and pass through preheater 25 and thence into distillation column 26 wherein a separation is effected between the excess solvent and the binary azeotropic entrainer-solvent mixture.

Upon distillation in tower 26 this entrainer-solvent azeotrope is removed as overhead through line 27 for condensation in condenser 28 and collection in accumulator 29. A portion of the condensate is returned as reflux to tower 26 by means of line 30, and the remainder of the condensate is passed through line 31 to be handled as hereinafter described. The remaining portion of solvent not distilled overhead from column 26 is removed as bottoms through line 41. A sufficient amount of this solvent is diverted through line 32 to be admixed in line 33 with the entrainer-solvent azeotrope contained in line 31 so that the entrainer and solvent of line 34 will exist in the proportions in which they appear in the azeotropic overhead from tower 13. The remainder of the solvent from the bottoms of column 26 which is not diverted to column 13 is directed through line 21 to column 20 for further solvent extraction. The mixture passing through line 34 and preheater 35 is charged to the main azeotropic column 13 and thereby a continuous process has been completed whereby the feed mixture has been resolved into two components and the system is a closed one requiring neither addition nor removal of supplementary material. Such small losses of material that might occur can be readily adjusted for by introducing the desired amount of entrainer or solvent from feed tank 45 through line 46 and then by way of line 34 into column 13 so that the various components are in the proportions corresponding to the composition of the azeotropic overhead removed from tower 13 upon distillation.

For convenience only, this disclosure will be described in connection with the azeotropic distillation of a hydrocarbon feed consisting of benzene and cyclohexane in the presence of a mixture of n-propyl alcohol and water as the entrainer and solvent respectively. Reference will be made to the flow sheet of the figure and the example will embody a charge of 1000 parts of hydrocarbon (750 benzene and 250 cyclohexane) where all concentrations are expressed on a weight basis. The hydrocarbon feed, consisting of 750 parts of benzene and 250 parts of cyclohexane, is charged from the feed tank 10 through line 11 and preheater 12 into the main azeotroping column 13. Also charged to column 13, through line 34, are 31 parts of n-propanol and 26 parts of water, these being the necessary amounts to effect the desired azeotropic separation. Upon distillation in tower 13, a heterogeneous ternary azeotrope is formed between cyclohexane, propanol, and water, the boiling point of which is about 66.6° C. at 760 mm. of Hg. This azeotropic mixture is removed overhead through line 14 for condensation in condenser 15 and collection in accumulator 16. A portion of the condensate is returned as reflux to tower 13 through line 17 and the remainder is passed through line 18 for subsequent removal of cyclohexane and preparation of the propanol-water mixture for recycle use. Essentially 750 parts of benzene are removed as bottoms from column 13 by means of line 39 where it can be sent for storage in tank 40. Heat is supplied to tower 13 by means of a reboiler 36, through which a portion of the bottoms from the tower is circulated through lines 38 and 37. The operating conditions are so maintained that substantially no benzene appears in the overhead vapors from column 13.

The azeotropic condensate from line 18, consisting essentially of 250 parts of cyclohexane, 31 parts of n-propanol, and 26 parts of water, is passed to extraction tower 20 where it is subjected to counter-current water washing. The water is supplied through line 21 in amount sufficient to completely dissolve the n-propanol and free the cyclohexane for removal from tower 20 through line 22 into the storage tank 23. In this example, a 2:1 weight ratio of water:n-propanol has been employed for the extraction. The 31 parts of alcohol will, therefore, be accompanied by 62 parts of water. Since 26 parts of water entered tower 20 through line 18 with the cyclohexane and n-propanol, there remains 36 parts of water to enter column 20 through line 21. This tower 20 may be operated at any given pressure but is desirably operated at atmospheric pressure for convenience. The 31 parts of alcohol and 62 parts of water are removed from the bottom of tower 20 by means of line 24 and pass through preheater 25 and then into distillation column 26, wherein a separation is effected between the excess water and the binary azeotrope n-propanol-water.

Upon distillation in tower 26, this n-propanol-water azeotrope, boiling at about 87.7° C. at 760 mm. of Hg, is removed as overhead through line 27 for condensation in condenser 28 and collection in accumulator 29. A portion of the condensate is returned as reflux to tower 26 by means of line 30, and the remainder of the condensate is passed through line 31 to be handled as hereinafter described. Essentially 50 parts of water are removed as bottoms from column 26 through line 41. A sufficient amount of this water is diverted through line 32 to be admixed with the n-propanol-water azeotrope contained in line 31 so that the n-propanol and water of line 34 will exist in the proportions in which they appear in the azeotropic overhead of tower 13. Line 31 produces 31 parts of n-propanol and 12 parts of water so that it is necessary to remove 14 parts of water through line 32 from the 50 parts of water passing through line 41. This leaves 36 parts of water which now pass through line 21 to be directed to column 20 for water extraction. Line 33 now contains 31 parts of n-propanol and 12 parts of water from line 31, and 14 parts of water from line 32, or a total of 31 parts of n-propanol and 26 parts of water. This mixture passes through line 34 and preheater 35 and is charged to the main azeotroping column 13. Heat is supplied to tower 26 by means of a reboiler 42, through which a portion of the bottoms from the tower is circulated through lines 44 and 43.

Thereby a continuous process has been completed where the feed mixture has been resolved into pure benzene for tank 40 and pure cyclohexane for tank 23. The system is a closed one and requires no addition or removal of supplementary material. Such small losses of material that might occur can be readily adjusted by introducing the desired amount of n-propanol or water, from feed tank 45 through line 46 and then by way of line 34 into column 13, so that the various components are in the proportions corresponding to the composition of the azeotropic overhead removed from tower 13 upon distillation.

As another example of this invention, I will describe the same separation using ethyl alcohol in place of n-propyl alcohol. On the same basis of 1000 parts of hydrocarbon charged to tower 13, there are now 56 parts of ethanol and 23 parts of water required to be charged to tower 13 through line 34. The 750 parts of benzene are removed from the bottom of column 13 by line 39, while the ternary azeotropic overhead removed through line 14 consists of 250 parts of cyclohexane, 56 parts of ethanol and 23 parts of water. This azeotropic mixture is charged to the extraction tower 20 by means of line 18, along with 89 parts of water through line 21. The 250 parts of cyclohexane are taken from the system through line 22, while 56 parts of ethanol and 112 parts of water are removed from tower 20 by means of line 24 and charged to the distillation column 26. The binary azeotropic overhead in line 31 from tower 26 consists of 56 parts of ethanol and 3 parts of water. The 109 parts of excess water are removed from the bottom of tower 26 through line 41. From this latter stream, 89 parts of water are sent to extraction tower 20 through line 21, and 20 parts of water pass through line 32 to combine with the 56 parts of ethanol and 3 parts of water from line 31. This total of 56 parts of ethanol and 23 parts of water pass through line 33 to line 34 and preheater 35 to the main azeotropic column 13.

In addition to the different compositions required by using ethanol instead of n-propanol, there are different overhead temperatures in towers 13 and 26. The main azeotroping column 13 now operates with an approximate overhead vapor temperature of 62.1° C. at 760 mm. of Hg, and distillation tower 26 has a vapor temperature of about 78.1° C. at 760 mm. of Hg. This is a decrease of 4.5° and 9.6° C., respectively. The first example required a charge to the main azeotroping column 13 of 22.8 parts of entrainer (12.4 parts of n-propanol and 10.4 parts of water) for every 100 parts of cyclohexane impurity admixed with the benzene. The second example required 31.6 parts of entrainer (22.4 parts of ethanol and 9.2 parts of water) for every 100 parts of cyclohexane present when charging to the same tower 13.

Still another example of this invention is the use of an allyl alcohol and water mixture to effect the separation of n-hexane-methylcyclopentane mixture. It is assumed that the charge consists of 1000 parts by weight of hydrocarbon mixture, the composition of which is 750 parts of methylcyclopentane and 250 parts of n-hexane. Line 11 now carries 750 parts of methylcyclopentane and 250 parts of n-hexane into tower 13. Charged to tower 13 through line 34 are 14 parts of allyl alcohol and 14 parts of water. The 750 parts of methylcyclopentane are removed from the bottom of column 13 by means of line 39, while the ternary azeotropic overhead removed through line 14 consists of 250 parts of n-hexane, 14 parts of allyl alcohol, and 14 parts of water. This azeotropic mixture is charged to the extraction tower 20 by means of line 18, along with 14 parts of water through line 21. The 250 parts of n-hexane are taken from the system through line 22, while 14 parts of allyl alcohol and 28 parts of water are removed from tower 20 by means of line 24 and charged to the distillation column 26. The binary azeotropic overhead in line 31 from tower 26 consists of 14 parts of allyl alcohol and 5 parts of water. The 23 parts of excess water are removed from the bottom of tower 26 through line 41. From this latter stream, 14 parts of water are sent to extraction tower 20 through line 21, and 9 parts of water pass through line 32 to combine with the 14 parts of allyl alcohol and 5 parts of water from line 31. This total of 14 parts of allyl alcohol and 14 parts of water pass through line 33 to line 34 and preheater 35 to the main azeotroping column 13.

It is further noted that the main azeotroping column 13 is operated with an overhead vapor temperature of approximately 59.7° C. at 760 mm. of Hg, while distillation column 26 has an overhead vapor temperature of about 88.2° C. at 760 mm. of Hg. This system requires a charge to the main azeotroping column 13 of 11.2 parts of entrainer and solvent (5.6 parts of allyl alcohol and 5.6 parts of water) for every 100 parts of n-hexane impurity present in the hydrocarbon feed.

Still another example of this invention is the use of benzene-acetonitrile to effect the separation of a n-heptane-methylcyclohexane mixture. It is assumed that the charge consists of 1000 parts by weight of hydrocarbon mixture, the composition of which is 75 wt. percent methylcyclohexane and 25 wt. percent n-heptane. Line 11 now carries 750 parts of methylcyclohexane and 250 parts of n-heptane into tower 13. Charged to tower 13 through line 34 are 35 parts of benzene and 222 parts of acetonitrile. The 750 parts of methylcyclohexane are removed from the bottom of column 13 by means of line 39, while the ternary azeotropic overhead removed through line 14 consists of 250 parts of n-heptane, 35 parts of benzene, and 222 parts of acetonitrile. This azeotropic mixture is charged to the extraction tower 20 by means of line 18, along with 222 parts of acetonitrile through line 21. The 250 parts of n-heptane are taken from the system through line 22, while 35 parts of benzene and 444 parts of acetonitrile are removed from tower 20 by means of line 24 and charged to distillation column 26. The binary azetropic overhead in line 31 from tower 26 consists of 35 parts of benzene and 23 parts of acetonitrile. The 421 parts of excess acetonitrile are removed from the bottom of tower 26 through line 41. From this latter stream, 222 parts of acetonitrile are sent to extraction tower 20 through line 21, and 199 parts of acetonitrile pass through line 32 to combine with the 35 parts of benzene and the 23 parts of acetonitrile from line 31. This total of 35 parts of benzene and 222 parts of acetonitrile passes through line 33 to line 34 and preheater 35 to the main azetroping column 13, thereby completing the continuous cycle of the process.

Examples of additional mixtures which may be separated by this process are carbon tetrachloride-ethylacetate using n-propanol as entrainer and water as solvent and cyclohexane-benzene using 2-butanone as entrainer and water as solvent.

In many cases, the ternary azeotrope will split into two layers when condensed and cooled. In such cases it may be desirable to handle the two layers separately rather than as a single stream as previously described. Referring to the first example, the overhead in line 18 from the ternary azeotroping column can be fed to a separator where an upper component-rich and a lower solvent-rich layer are formed. The component-rich layer is then extracted with a sufficient amount of solvent to free the component. The solvent-entrainer extract is then combined with the solvent rich layer from the separator and this combined stream is the charge to binary azeotroping column 26, the bottoms from which are partly diverted and combined with the overhead from the same column, as heretofore described, and the remainder of the bottoms forms the solvent for washing the component-rich layer from the separator.

A similar alternate treatment is possible for the other examples herein described.

As shown in the foregoing examples, a broad range of materials may be employed as both entrainer and solvent upon different type component mixtures. In selecting an entrainer and solvent for the separation of a component from any given mixture, the following should be kept in mind. The entrainer must form a ternary azeotropic mixture with one of the components and the solvent. Furthermore it must be considerably more soluble in the solvent than in the component which is desired to be separated. The requisite properties of the solvent are such that it must form a ternary with the component of the original mixture and the entrainer while at the same time having a greater solvent power for the entrainer than for the component of the original mixture.

As seen from the foregoing, the present process is applicable wherever it is desired to separate through the use of entrainer-solvent mixtures by ternary azeotropic distillation, a component of a mixture which is virtually insoluble in the entrainer-solvent mixture.

Modifications of the above process which are not covered in the prior art and which would occur to one skilled in the art are to be included in the invention as defined in the following claims.

I claim:

1. A continuous cyclical process for the separation of a mixture comprising cyclohexane and benzene which comprises adding n-propanol and water to the mixture in amounts only sufficient to form an azeotrope with all of the cyclohexane, distilling the resulting mixture so as to form a distillate consisting essentially of a ternary azeotrope of cyclohexane, n-propanol and water, condensing this azeotrope, washing the azeotropic condensate, without previous separation of its components, with an amount of water such that the cyclohexane will be removed as insoluble and the remaining amount of water and n-propanol when subjected to a binary distillation will form an overhead binary azeotrope consisting essentially of n-propanol and water and bottoms comprising water, binary distilling said water and n-propanol and then returning the n-propanol-water distillate and a sufficient amount of the water bottoms to the ternary azeotropic distillation in an amount identical to their original concentration in the ternary azeotropic distillation.

2. A continuous cyclical process for the separation of a mixture comprising cyclohexane and benzene which comprises adding n-propanol and water to the mixture in amounts only sufficient to form an azeotrope with all of the cyclohexane, distilling the resulting mixture so as to form a distillate consisting essentially of a ternary azeotrope of cyclohexane, n-propanol and water and bottoms comprising benzene, condensing this azeotrope, washing the azeotropic condensate, without previous separation of its components, with an amount of water such that the cyclohexane will be removed as insoluble and the remaining amount of water and n-propanol when subjected to a binary distillation will form an overhead binary azeotrope consisting essentially of n-propanol and water, and bottoms comprising water, distilling said water and n-propanol mixture and then returning the n-propanol-water binary azeotrope and a portion of the water bottoms to the ternary azeotropic distillation in an amount identical to their original concentration in the ternary azeotropic distillation, and employing the remainder of the water bottoms for extracting the ternary azeotropic condensate.

3. The process according to claim 1 in which the cyclohexane, n-propanol and water are present in the ratio of 250:31:26 in the ternary azeotropic distillation and in which 36 parts of water are added for washing the ternary azeotropic condensate.

4. The process according to claim 1 in which both the ternary azeotropic distillation and the binary azeotropic distillation are performed at atmospheric pressure.

JAMES M. HARRISON.

REFERENCES CITED

The following references are of record in the file of this patent:

UNITED STATES PATENTS

| Number | Name | Date |
|---|---|---|
| 2,265,220 | Sullivan | Dec 9, 1941 |
| 2,302,608 | Field | Nov. 17, 1942 |
| 2,348,726 | Clark | May 16, 1944 |
| 2,356,240 | Hamlin | Aug. 22, 1944 |
| 2,367,701 | Tooke | Jan. 23, 1945 |
| 2,368,050 | Tooke | Jan. 23, 1945 |
| 2,375,478 | Lake | May 8, 1945 |
| 2,413,245 | Reed | Dec. 24, 1946 |
| 2,440,414 | Obled | Apr. 27, 1948 |

OTHER REFERENCES

Bruun et al., Bureau of Standards Journal of Research, vol. 5, pages 933–937 (1930).

Methyl Ethyl Ketone, book copyrighted 1938 by Shell Chemical Company, page 25.

Mair et al., Bureau of Standards Journal of Research, vol. 27, pages 37–63 (July 1941).

Marschner et al., "Hydrocarbon Azeotropes of Benzene," Industrial and Engineering Chemistry, vol. 38, pages 262 to 268 (March 1946).